United States Patent
Tonchia

(10) Patent No.: US 10,185,047 B2
(45) Date of Patent: Jan. 22, 2019

(54) CONTROLLER AND METHOD FOR STEERING SOURCES

(71) Applicant: CGGVERITAS SERVICES SA, Massy (FR)

(72) Inventor: Helene Tonchia, Antony (FR)

(73) Assignee: CGG SERVICES SAS, Massy (FR)

( * ) Notice: Subject to any disclaimer, the term of this patent is extended or adjusted under 35 U.S.C. 154(b) by 1676 days.

(21) Appl. No.: 13/680,320

(22) Filed: Nov. 19, 2012

(65) Prior Publication Data

US 2013/0155805 A1    Jun. 20, 2013

(30) Foreign Application Priority Data

Dec. 15, 2011    (FR) ...................... 11 61714

(51) Int. Cl.
*G01V 1/38*    (2006.01)

(52) U.S. Cl.
CPC .......... *G01V 1/3826* (2013.01); *G01V 1/3817* (2013.01); *G01V 1/3835* (2013.01)

(58) Field of Classification Search
USPC ......................................................... 367/16
See application file for complete search history.

(56) References Cited

U.S. PATENT DOCUMENTS

| | | |
|---|---|---|
| 3,921,124 A | 11/1975 | Payton |
| 4,087,780 A | 5/1978 | Itria et al. |
| 4,323,989 A | 4/1982 | Huckabee et al. |
| 4,506,352 A | 3/1985 | Brandsaeter |
| 4,719,987 A | 1/1988 | George, Jr. et al. |
| 4,748,599 A | 5/1988 | Gjestrum et al. |
| 4,831,599 A | 5/1989 | Dragsund et al. |
| 4,845,686 A | 7/1989 | Brac |
| 4,862,422 A | 8/1989 | Brac |
| 6,011,753 A | 1/2000 | Chien |
| 6,590,831 B1 | 7/2003 | Bennett et al. |

(Continued)

FOREIGN PATENT DOCUMENTS

| | | |
|---|---|---|
| AU | 2012261742 A1 | 7/2013 |
| EP | 0 018 053 A1 | 10/1980 |

(Continued)

OTHER PUBLICATIONS

French Preliminary Search Report dated Sep. 11, 2012 in related French Application No. 1161714.

(Continued)

*Primary Examiner* — Jack W Keith
*Assistant Examiner* — John T Nolan
(74) *Attorney, Agent, or Firm* — Patent Portfolio Builders PLLC

(57) ABSTRACT

A marine acoustic source system and method for steering a seismic source array in a body of water during a seismic survey. The method includes measuring an actual position of the seismic source array; calculating a virtual position of the seismic source array, wherein the virtual position corresponds to a position of the seismic source array when towed with no adjustment from a source steering device; retrieving a pre-plot path that includes desired positions of the seismic source array for the seismic survey; and steering the vessel based on the virtual position so that the virtual position lies on the pre-plot path.

20 Claims, 15 Drawing Sheets

(56) References Cited

U.S. PATENT DOCUMENTS

| | | |
|---|---|---|
| 6,606,958 B1 | 8/2003 | Bouyoucos |
| 6,681,710 B2 | 1/2004 | Semb |
| 6,691,038 B2 | 2/2004 | Zajac |
| 7,415,936 B2 | 8/2008 | Storteig et al. |
| 7,457,193 B2 | 11/2008 | Pamik |
| 7,463,549 B2 | 12/2008 | Naess |
| 7,466,632 B1 | 12/2008 | Sorli |
| 7,577,060 B2 | 8/2009 | Toennessen et al. |
| 7,738,317 B2 | 6/2010 | Toennessen |
| 7,755,970 B2 | 7/2010 | Welker et al. |
| 7,804,738 B2 | 9/2010 | Storteig et al. |
| 8,228,756 B2 | 7/2012 | Toennessen |
| 8,547,782 B2 | 10/2013 | Howlid et al. |
| 2007/0064526 A1* | 3/2007 | Holo ............................... 367/15 |
| 2007/0127971 A1 | 10/2007 | Semb et al. |
| 2007/0247971 A1 | 10/2007 | Semb et al. |
| 2008/0175097 A1* | 7/2008 | Storteig et al. ................. 367/16 |
| 2008/0279042 A1 | 11/2008 | Storteig et al. |
| 2008/0316859 A1 | 12/2008 | Welker et al. |
| 2009/0092005 A1 | 4/2009 | Goujon et al. |
| 2009/0141587 A1 | 6/2009 | Welker et al. |
| 2011/0286302 A1 | 11/2011 | Welker et al. |
| 2013/0155805 A1 | 6/2013 | Tonchia |
| 2014/0029380 A1 | 1/2014 | Howlid et al. |

FOREIGN PATENT DOCUMENTS

| | | |
|---|---|---|
| EP | 2605048 A1 | 6/2013 |
| FR | 2984526 B1 | 10/2014 |
| GB | 2 414 804 A | 7/2005 |
| GB | 2 400 662 A | 8/2006 |
| GB | 2424950 B | 10/2008 |
| GB | 2424217 B | 2/2010 |
| WO | 01/61380 A2 | 8/2001 |
| WO | 02/059650 A1 | 8/2002 |
| WO | 2005/096018 A1 | 10/2005 |

OTHER PUBLICATIONS

First Office Action in corresponding Chinese Application No. 201210539971.4 dated Apr. 29, 2016. (Reference were submitted in an Information Disclosure Statement dated Nov. 19, 2012.).

Office Action in Republic of Indonesia Application No. P00201201166 dated Apr. 5, 2018.

* cited by examiner

CONTROLLER AND METHOD FOR STEERING SOURCES

BACKGROUND

Technical Field

Embodiments of the subject matter disclosed herein generally relate to methods and systems and, more particularly, to mechanisms and techniques for steering sources while being towed in water by a vessel.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon reservoirs.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until it is detected by the receiver 11 on the streamer 12. Based on the data collected by the receiver 11, an image of the subsurface is generated by further analyses of the collected data.

The seismic source array 16 may include plural individual source elements. The individual source elements may be grouped in sub-arrays, so that each source array may include one or more sub-arrays. The individual source elements may be distributed in various patterns, e.g., circular, linear, at various depths in the water. FIG. 2 shows a vessel 40 towing two cables 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 and to the lead-in cables 46 via ropes 54. However, this configuration does not allow an accurate control of the plural individual source elements. In other words, a position of the source array 16 cannot be adjusted except by changing the position of the vessel 40.

Further, the presence of the deflectors 44 introduces a further control problem as the deflectors rely on hydrodynamic forces, e.g., lift, created by the motion through the water to pull the streamers 50 outwardly to maintain their separation relative to the vessel path during the survey. Thus, water currents or other environmental factors may affect the lift, determining the deflectors to move closer to each other. As such, the positions of the streamers 50 and the plural individual source elements 52 are also affected by the positions of the deflectors. In this instance, the navigation system of the vessel modifies a trajectory of the vessel for bringing the sources as close as possible to a desired position. However, it is undesirable to use the navigation system of the vessel to adjust the positions of the sources because a change in the position of the vessel also changes the positions of the streamers.

Further, as four-dimensional (4-D) geophysical imaging is becoming more desired today, controlling the positions of the source array and of the streamers is important. 4-D geophysical imaging involves 3-D seismic surveys repeated over the same subsurface at different moments in time to determine changes in the geophysical structures of the subsurface. Thus, as the 3-D survey is repeated in time, sometimes after a few months or years, it is desirable that the sources and streamers being used to perform the seismic survey are located as closely as possible to the same locations as in the previous survey over the subsurface.

Thus, it is challenging with existing source steering technology to position both the source arrays and the streamers, at different moments in time, at the same locations given the cross-currents, wind, waves, shallow water and navigation obstacles that are currently encountered by vessels that perform the seismic surveys.

Accordingly, it would be desirable to provide systems and methods that provide a method for steering source arrays at a desired location during towing underwater by a vessel without changing the position of the vessel.

SUMMARY

According to one exemplary embodiment, there is a method for steering a seismic source array in a body of water during a seismic survey. The method includes measuring an actual position of the seismic source array; calculating a virtual position of the seismic source array, wherein the virtual position corresponds to a position of the seismic source array when towed with no adjustment from a source steering device; retrieving a pre-plot path that includes desired positions of the seismic source array for the seismic survey; and steering the vessel based on the virtual position so that the virtual position lies on the pre-plot path.

According to another exemplary embodiment, there is a seismic surveying system configured to steer a seismic source array in a body of water during a seismic survey. The system includes a central control unit configured to, receive an actual position of the seismic source array, and calculate a virtual position of the seismic source array, wherein the virtual position corresponds to a position of the seismic source array when towed with no adjustment from a source steering device. The system also includes a memory configured to store a pre-plot path that includes desired positions of the seismic source array for the seismic survey; and an integrated navigation system configured to steer a vessel that tows the source array based on the virtual position so that the virtual position lies on the pre-plot path.

According to yet another exemplary embodiment, there is a computer readable medium including computer executable instructions, wherein the instructions, when executed by a processor, implement a method for steering a seismic source array in a body of water during a seismic survey. The instructions are configured to implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
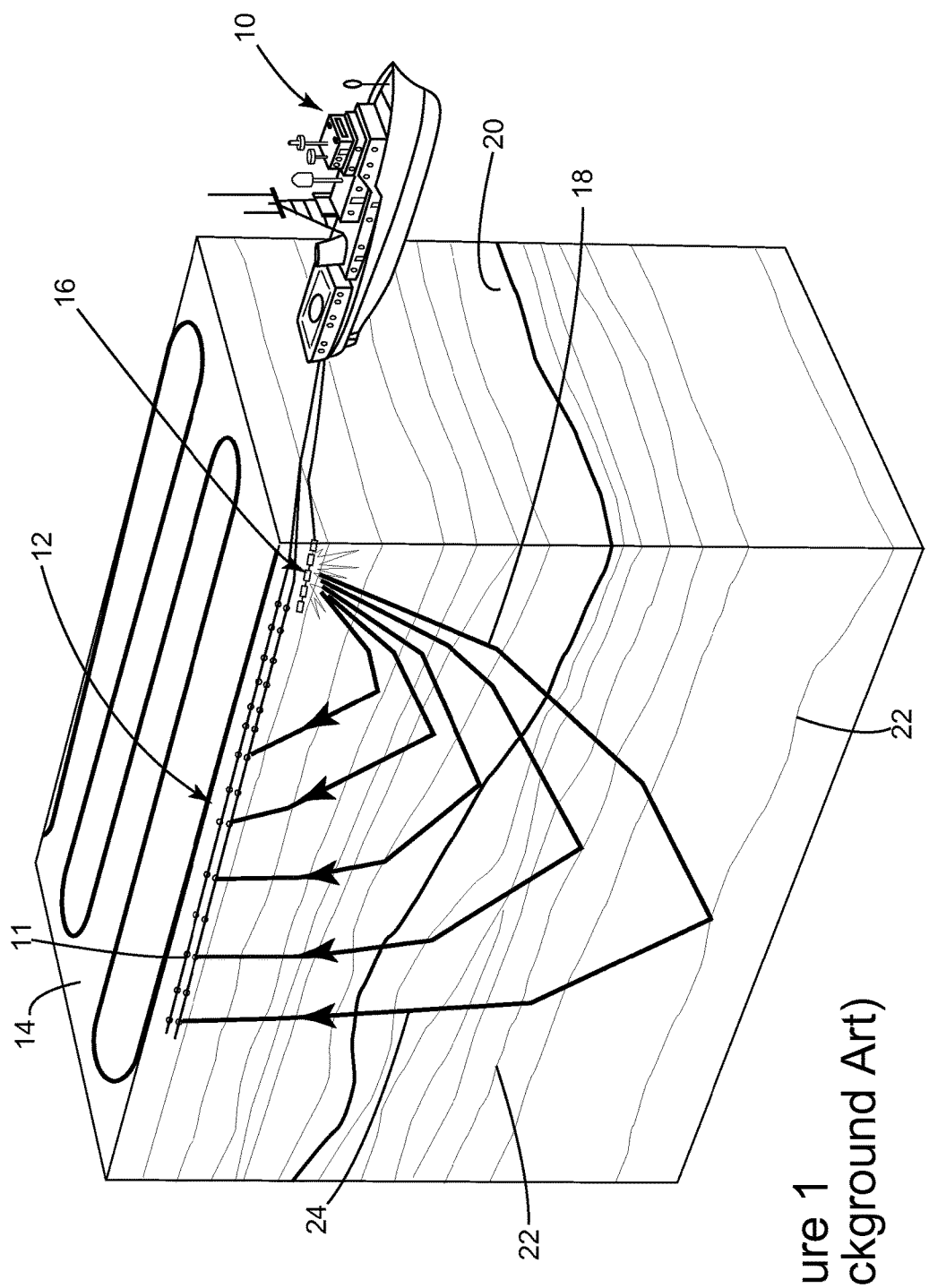
FIG. 1 is a schematic diagram of a conventional seismic survey system.
Figure 2:
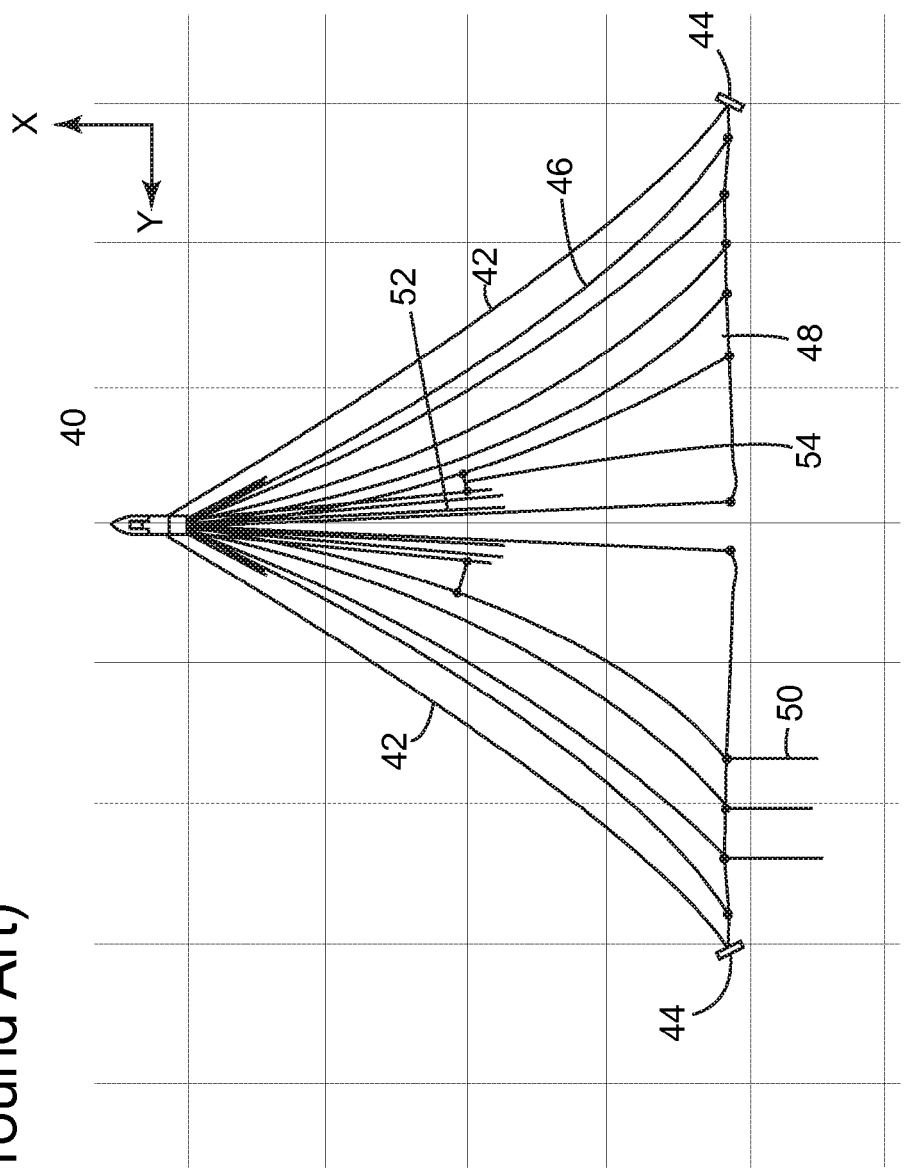
FIG. 2 illustrates a traditional arrangement of a source array that is towed by a vessel.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic source array being towed by a vessel and being connected to at least one source steering device. However, the embodiments to be discussed next are not limited to this source array, but may be applied to other seismic elements as, for example, streamers.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need a steerable seismic source array. According to an exemplary embodiment, such steerable seismic source arrays are configured to include at least a source steering device that is capable to adjust a position of the source array while being towed by a vessel and without involving a change of the path of the vessel. In other words, a position of the source array may be changed during a seismic survey without changing the cross-line position of the vessel that tows the source. To achieve this goal, a controller of the source steering device cooperates with the navigation system of the vessel so that some positional changes of the source array are not taken into consideration by the vessel.

More specifically, according to an exemplary embodiment, there is a method for steering a seismic source array in a body of water during a seismic survey. The method includes a step of measuring an actual position of the seismic source array; a step of calculating a virtual position of the seismic source array; a step of retrieving a pre-plot path that includes desired positions of the seismic source array for the seismic survey; and a step of steering the vessel based on the virtual position so that the virtual position lies on the pre-plot path. Further, the method adjusts the settings of a source steering device to change the actual position of the source array. In one exemplary embodiment, adjusting the source steering device (e.g., a winch) is much faster than adjusting a position of the vessel. Thus, in this case, the actual position of the source array is first adjusted by the source steering device and then the vessel is instructed to change its position to adjust the virtual position of the source array. These adjustments of the source steering device and the position of the vessel may continue for some time until the actual position and the virtual position substantially coincide. It is noted that in one exemplary embodiment, by adjusting the position of the vessel and thus, implicitly the virtual position, the actual position is disturbed and the source steering device needs to adjust it. The frequency of adjusting the actual position with the source steering device may be a parameter that is chosen by the operator of the vessel.

In another exemplary embodiment, there is an interface between (i) dedicated systems that steer the vessel and (ii) one or more source steering devices as known in the art. In other words, an existing vessel having a known steering system and also having a known source steering device may be retrofitted with the novel interface for steering the vessel so that a virtual position is used instead of an actual position of the source. The novel interface may be integrated, as discussed later, in a control system.

Figure 3:
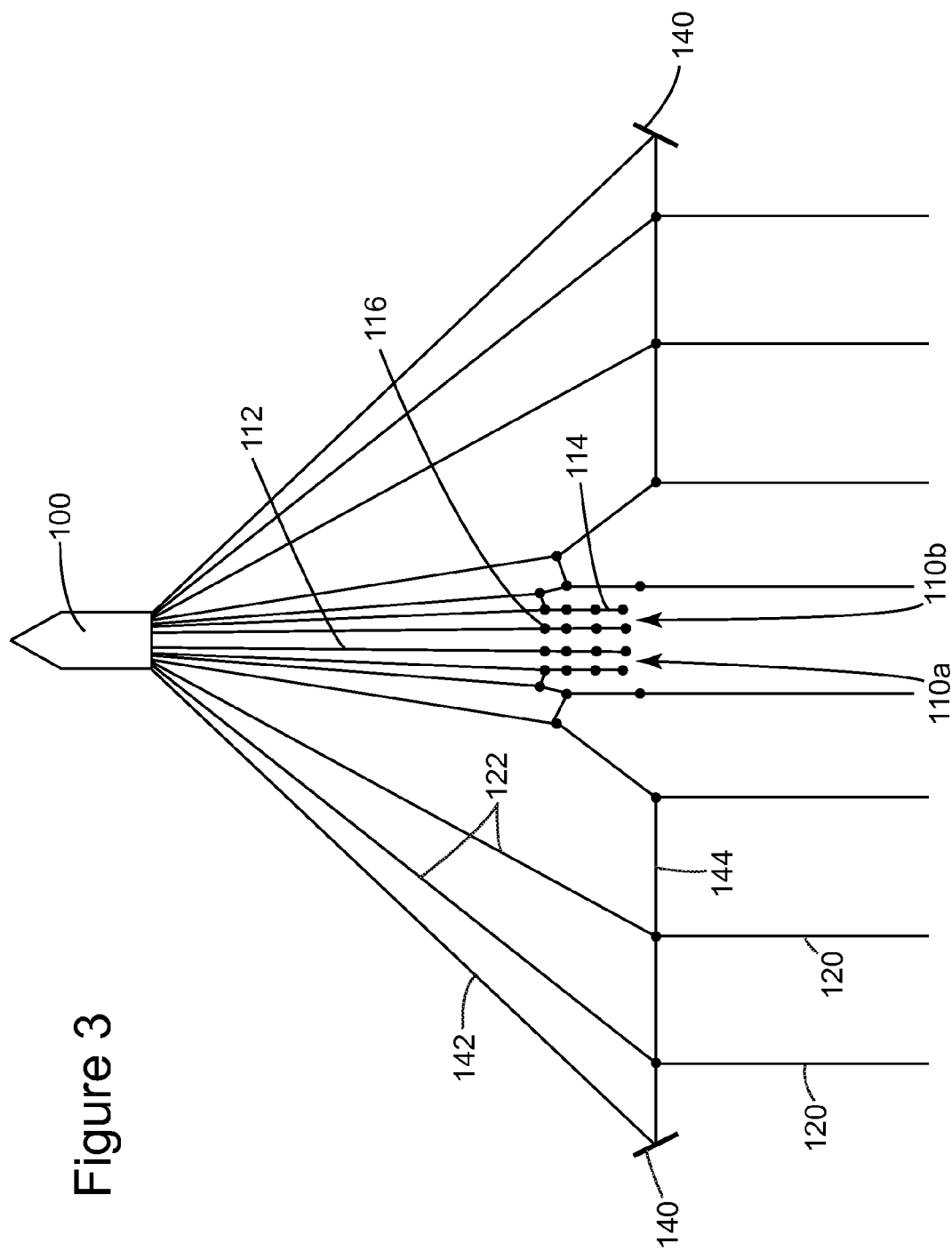
FIG. 3 illustrates an arrangement of steerable source arrays and plural streamers according to an exemplary embodiment.
Figure 4:
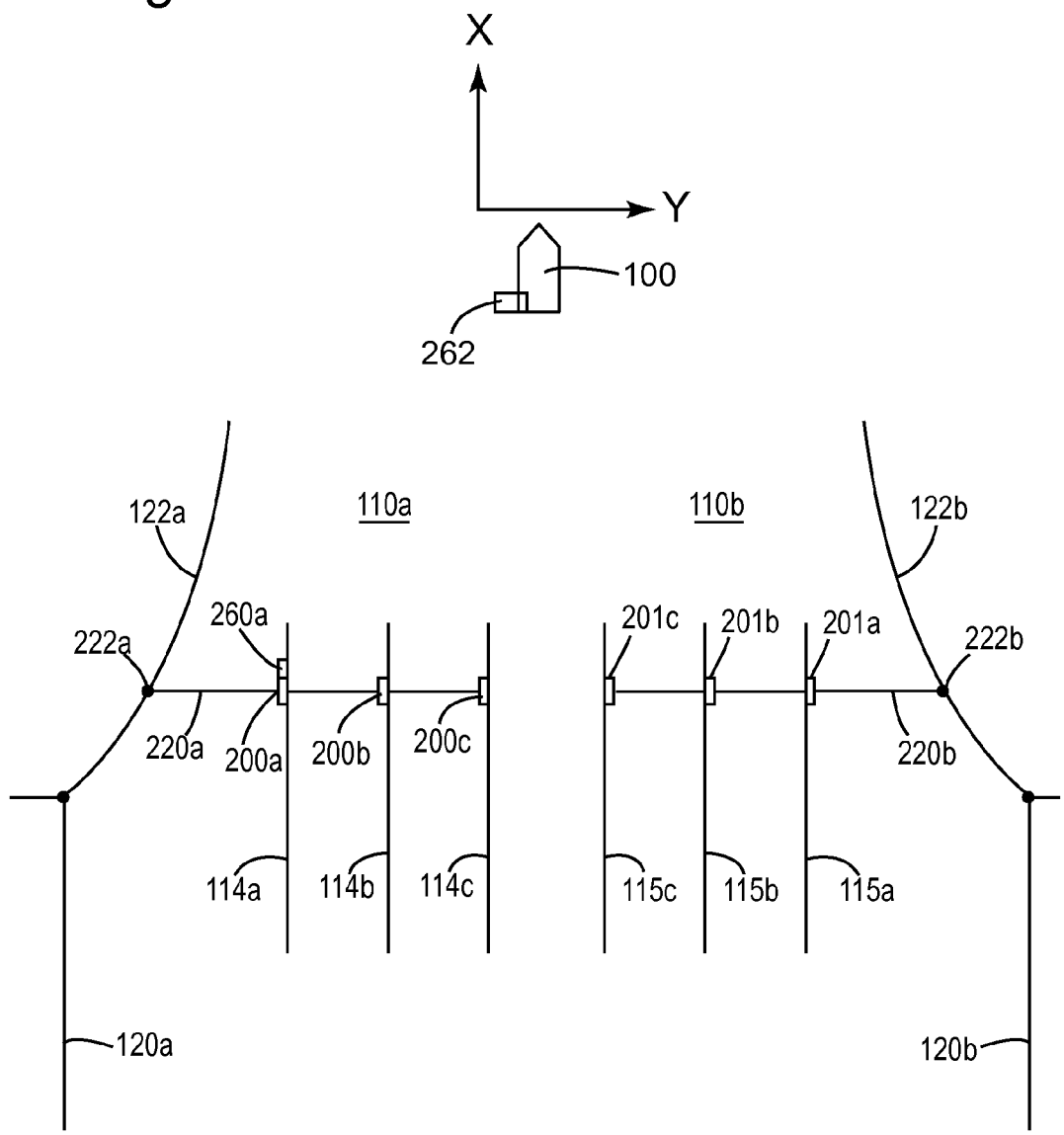
FIG. 4 is a schematic diagram of two source arrays having source steering devices according to an exemplary embodiment.

Prior to describing this method and the corresponding interface in more details, a configuration of a seismic survey system is described with reference to FIGS. 3 and 4. Based on the exemplary system shown in these figures, it is then explained the method of controlling the source steering device and the source arrays. Thus, the embodiments shown in FIGS. 3 and 4 are not intended to limit the applicability of the invention but only to provide a simple example for explaining the control method. Further, in the following, a seismic source array is considered to include, as individual source elements, an air gun, a water gun, a vibratory source, etc.

According to an exemplary embodiment illustrated in FIG. 3, a vessel 100 tows two source arrays 110a and 110b (it is also possible to tow only one source or more than two sources but, for simplicity, the novel features are discussed with regard to two source arrays) and plural streamers 120. The streamers 120 are connected to the vessel through lead-ins 122 while the source arrays 110a and 110b are connected to the vessel 100 through cables 112. Each source array 110a or 110b may include sub-arrays 114, each sub-array having plural individual source elements 116. Deflectors 140 are provided on the sides of this arrangement to maintain a transverse distance (relative to the path of the vessel) between the streamers 120. The deflectors 140 are connected to the vessel 100 via wide tow cables 142, and spread ropes 144 are used to separate the streamers from each other.

It is noted that the terms "rope" and "cable" and "wire" are used sometimes interchangeably in this document. Thus, these terms should not be construed in a narrow sense but rather as those skilled in the art would expect. The number of streamers or source arrays is exemplary and not intended to limit the applicability of the novel concepts.

Figure 5:
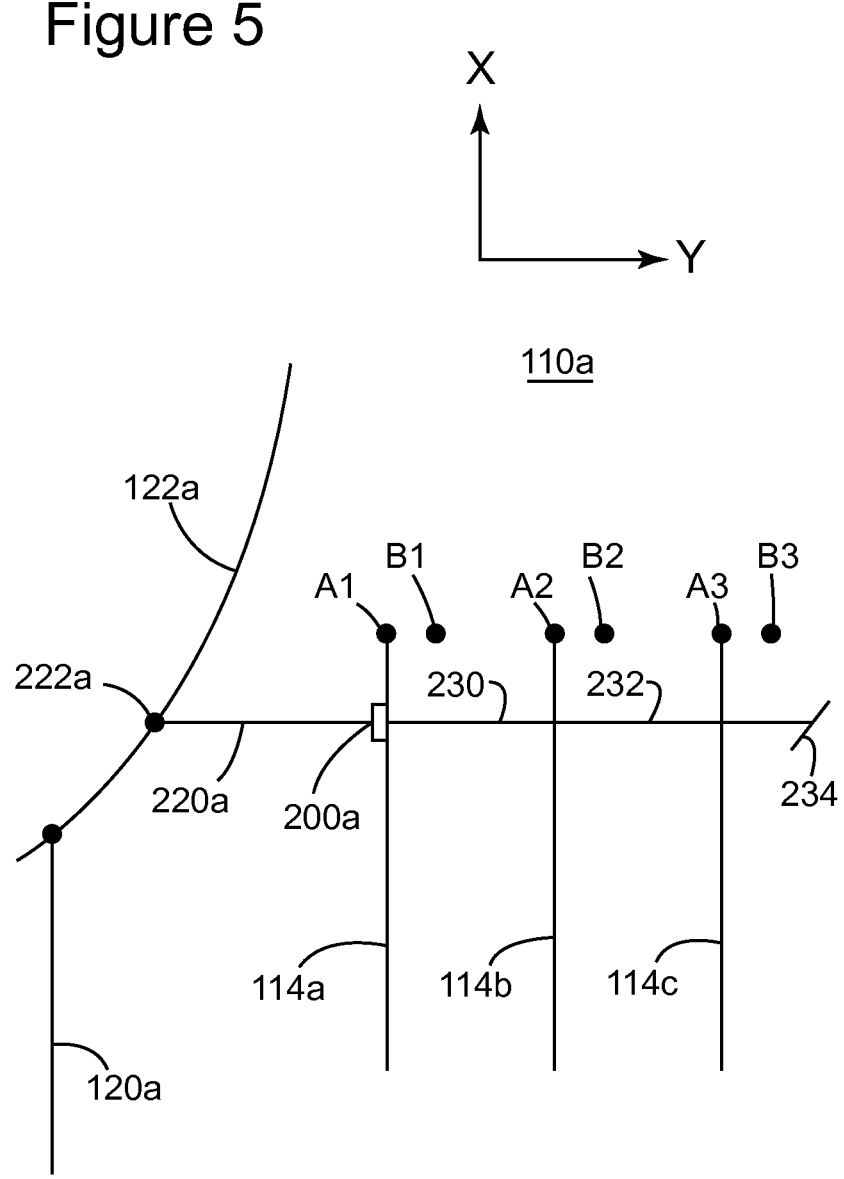
FIG. 5 is a schematic diagram of a source array having a source steering device according to an exemplary embodiment.

FIG. 4 shows in more detail the two source arrays 110a and 110b and their source steering devices 200a and 201a. FIG. 4 shows each source array having three sub-arrays. Further, the figures show each sub-array 114a-c and 115a-c of the source arrays 110a and 110b having their own source steering devices (200a-c and 201a-c). However, the novel method to be discussed later for steering the source arrays is also applicable if there is only one source steering device per source array. If there is only one source steering device per source array, then a deflector 234 or similar element, as shown in FIG. 5, could be attached to the sub-array 114c for maintaining the cables 230 and 232 stretched, for maintaining a desired distance between the sub-arrays. It is noted that the source steering devices discussed herein are exemplary in nature and other locations or types for them may be used. For example, the source steering device may be a winch located on the vessel and connected with ropes or cables to one or more sub-arrays for adjusting their positions along the Y-axis. However, for simplicity, in the following, the source steering device is considered to be a winch located on a sub-array.

FIGS. 4 and 5 also show ropes 220a and 220b connecting the source steering devices 200a and 201a to lead-ins 122a and 122b, respectively. The lead-ins 122a and 122b may or may not be connected to corresponding streamers 120a and 120b. In this application, the positions of each source array 110a or 110b are independently controlled from each other.

It is noted that cable 220a (and 220b) may be either fixed to the lead-in 122a or may be provided with a slider 222a that can move freely along the cable 122a. The slider 222a may include, for example, a pulley. Thus, the cable 220a may be maintained substantially perpendicular on the sub-array 114a as the length of the cable 220a is adjusted by the source steering device 200a.

Figure 6:
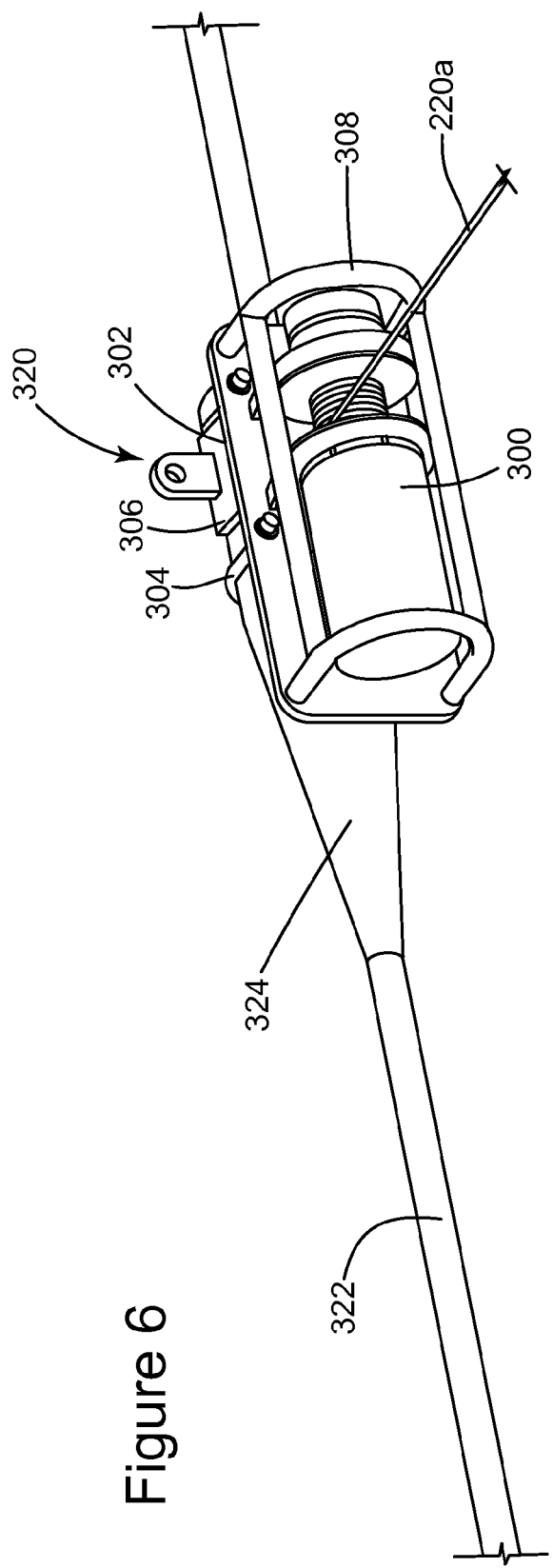
FIG. 6 is close view of a source steering device as attached to a sub-array according to an exemplary embodiment.

A source steering device may be an actuator device 300 as show in FIG. 6, or a deflector, or a thruster, or a rudder or any device that may change the position of the source array. The actuator device 300 may be a winch that is attached, for example, to a base plate 302. The base plate 302 is connected by curved bolts 304 and screws 306 to a bell housing 320. The bell housing 320 is a frontal part of the source array. Other methods for connecting the winch to the bell housing may be used. The bell housing 320 may be connected to the connection (or umbilical) 322 of the source array via an intermediate piece 324. For example, this intermediate piece 324 may be made of polyurethane and thus has a bending property. In one application, the actuator device 300 may be attached to a bend restrictor device instead of the bell housing 320.

To control the source steering devices for the above noted configurations, it is possible to have a local control mechanism for each source steering device and/or a central control mechanism that interacts with the local control mechanisms. For example, as shown in FIG. 4, the source steering device 200a may have its own local control mechanism 260a that may be programmed to maintain a certain position of the corresponding sub-array 114a. In another application, the local control mechanism 260a communicates (wired or wireless) with a central control mechanism 262 situated on the towing vessel 100 in order to receive the position coordinates for the source array and/or sub-arrays. Thus, the central control mechanism 262 may be configured to instruct the local control mechanism 260a with regard to when and how long to activate the source steering device. These relationships are now discussed in more detail with regard to FIG. 7.

Figure 7:
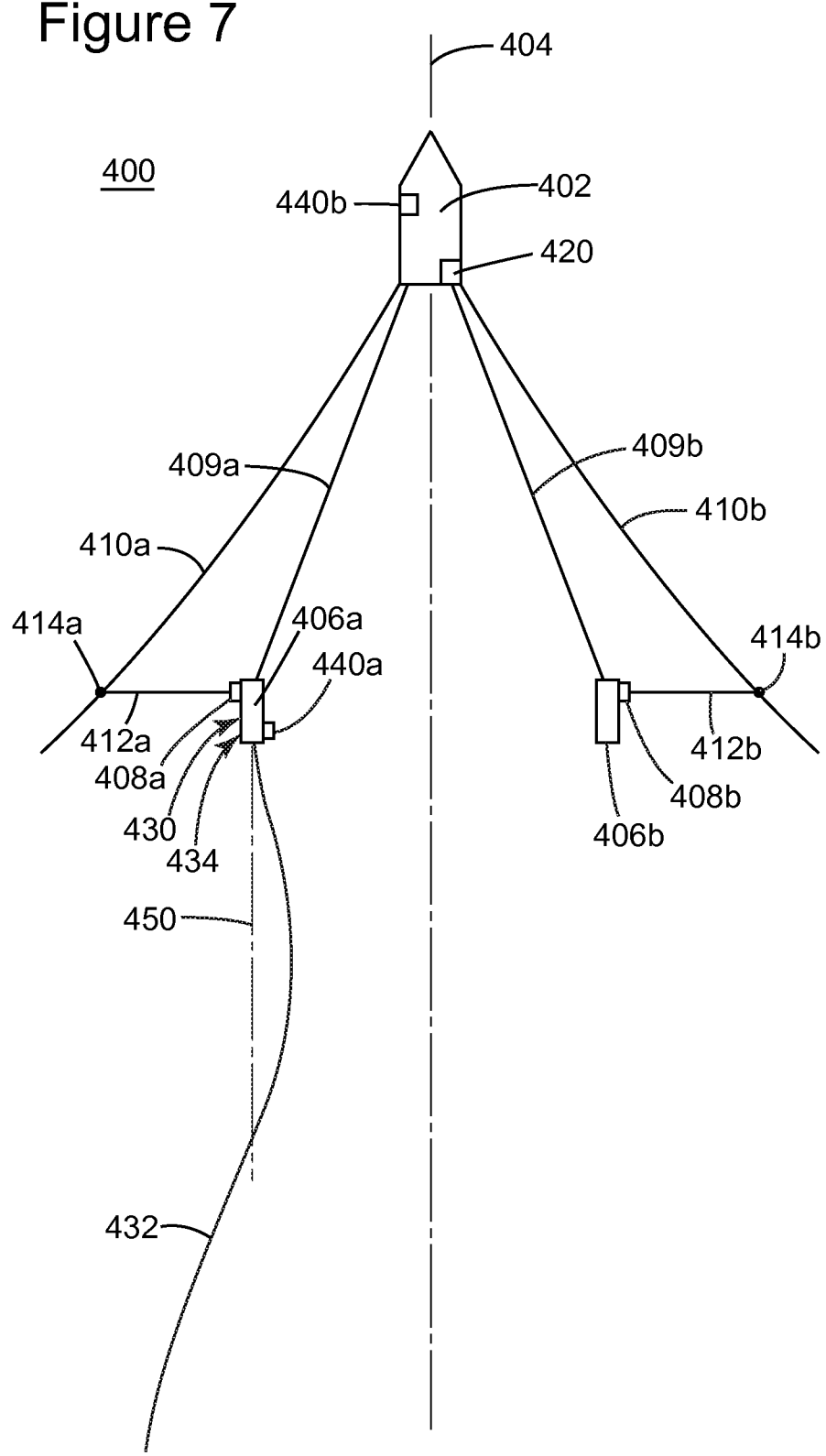
FIG. 7 is an overview of a seismic survey system that corrects a position of a source array with a source steering device according to an exemplary embodiment.

For simplicity, FIG. 7 shows a seismic survey system 400 that includes a towing vessel 402 that follows a predetermined travel path 404. The vessel 402 tows two source arrays 406a and 406b, each including at least one source steering device 408a and 408b, respectively. The sources 406a and 406b are directly connected to the vessel 402 through cables 409a and 409b. The source steering devices 408a and 408b are connected to lead-ins 410a and 410b through cables 412a and 412b. These cables may be connected to the lead-ins, as discussed above, i.e., through corresponding sliders 414a and 414b.

A controller 420 provided on the vessel 402 is configured to generate commands to be provided to the vessel 402 to change its position such that source arrays 406a and 406b follow predetermined paths (source pre-plot paths) 450. In this case, the controller 420 interacts with an integrated navigation system (not shown but to be discussed later) of the vessel for steering the source arrays 406a and 406b. It is noted that the vessel 402 does not adjust its trajectory when a deviation of the source arrays 406a and 406b from the source pre-plot path 450 are below a predetermined threshold.

For steering the vessel, the traditional methods use an actual position 430 of the source array and compares it to a desired path or source pre-plot path 450. If a difference between the pre-plot path 450 and the actual position 430 of the source array is determined to be larger than the predetermined threshold, the vessel is steered to bring the actual position 430 of the source array closer to the source pre-plot path 450.

However, in an exemplary embodiment, the actual position 430 of the traditional method is not used to steer the vessel. According to this exemplary embodiment, a virtual position 434 of the source array is introduced as discussed next and the virtual position 434 of the source array is fed to the vessel. Thus, the vessel adjusts the virtual position 434 of the source array relative to the source pre-plot path 450. The virtual position 434 is defined as a position of the source array when the source steering device is not present or, if the source steering device is present, as a position that the source array will take when the source steering device is not in use, i.e., it is in a neutral position. The neutral position may be defined based on the nominal configuration of the survey, e.g., for two sources separated by 25 m, symmetrical around a longitudinal axis of the vessel.

An example is provided to illustrate this concept. Assuming that the source steering device 408a of the source array 406a is a winch, the winch has a neutral position in which its cable is neither extended nor retrieved. For example, as shown in FIG. 7, the cable 412a has a length L for maintaining the source array 406a at a desired position. This position is called the neutral position of the source steering device and it corresponds to the virtual position of the source array. When the cable 412a is neither extended nor retrieved, the actual position 430 of the source array 406a coincides with the virtual position 434.

Figure 8A:
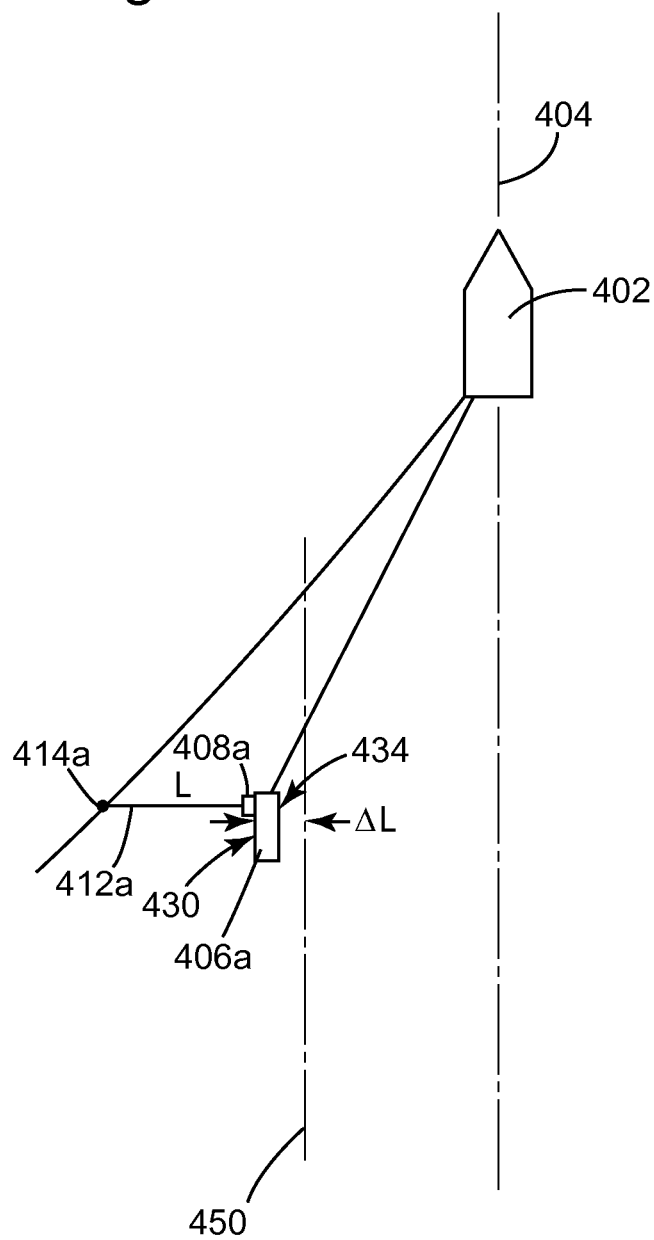
FIGS. 8A-D illustrate a seismic survey system that corrects a position of a source array with a source steering device and by changing a path of a towing vessel according to another exemplary embodiment.
Figure 8B:
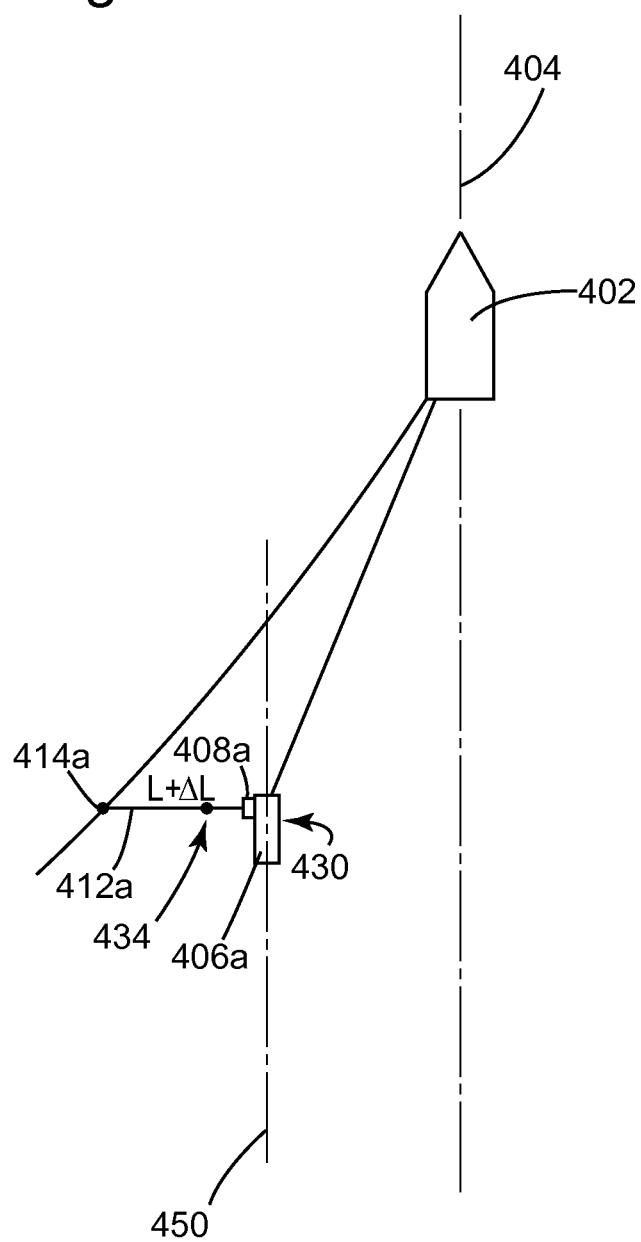

Thus, according to an exemplary embodiment, the vessel is steered so that the virtual position 434 of the source array 406a is maintained along the source pre-plot path 450. Suppose that the actual position 430 of the source array 406a deviates by a distance ΔL from the source pre-plot path 450 as shown in FIG. 8A. This may happen, for example, due to ocean currents. Other factors may determine this deviation. At this stage, the actual position 430 still coincides with the virtual position 434. However, the actual position 430 of the source array needs to be corrected so that the seismic survey is accurate. In a first instance, the source steering device 408a extends the rope 412a from a length L (as shown in FIG. 8A) to a length L+ΔL (as shown in FIG. 8B). Thus, the actual position 430 of the source array is brought on the source pre-plot path 450 in a short amount of time as activating the source steering device is much quicker than adjusting a position of the vessel 402. In one application, the distance ΔL is achieved in incremental steps, i.e., the actual position 430 of the source array is measured and the source steering device is adjusted with an increment of ΔL and then these steps are repeated until the actual position 430 lies on the source pre-plot path 450.

However, the virtual position 434 of the source array 406a is as shown in FIG. 8B, i.e., corresponds to the length L of the rope 412a. As noted above, the virtual position 434 if provided to the vessel 402 as being the actual position of the source array 406a. Based on this information, the vessel 402 starts to change its path to move in the positive direction of the Y-axis so that the virtual position 434 is gradually brought on the source pre-plot path 450.

Figure 8C:
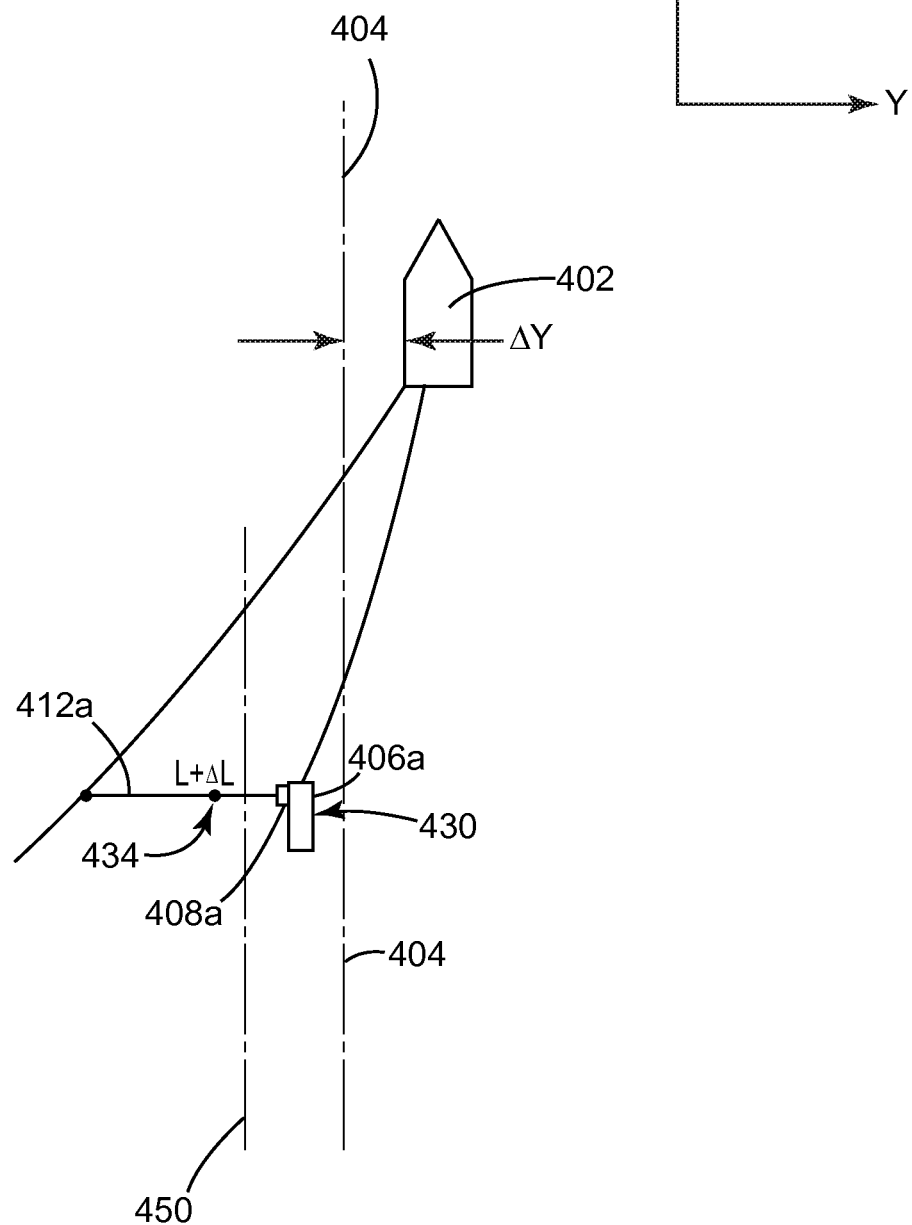
Figure 8D:
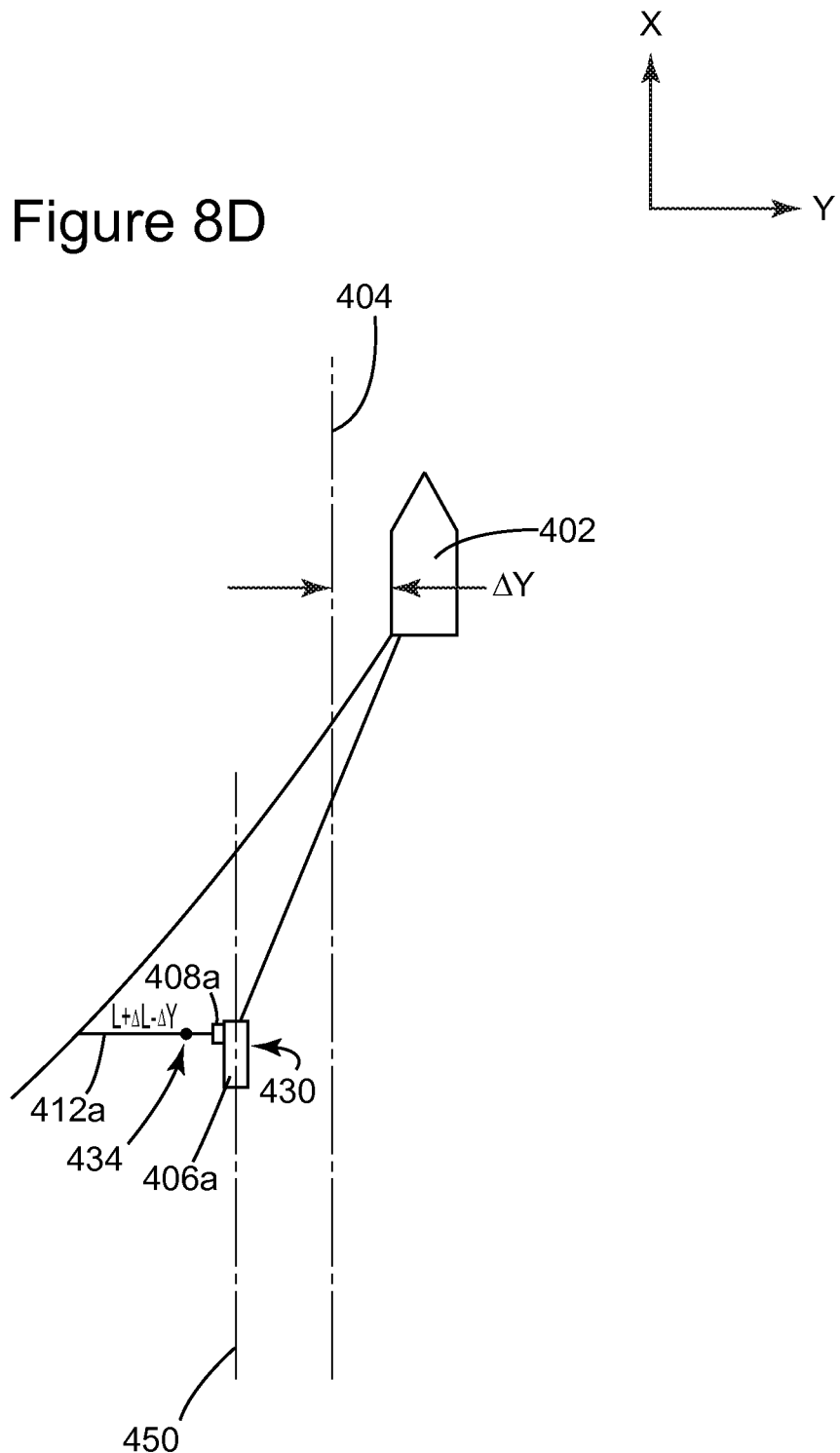

As the vessel 402 moves with ΔY (it is noted that the distances shown in the figures are not at scale) along the positive direction of the Y-axis as shown in FIG. 8C, the actual position 430 of the source array 406a moves with ΔY away from the source pre-plot path 450 but the virtual position 434 is closer to the path 450. Thus, the source steering device 408a is now instructed to retract the rope 412a by an equal amount to reposition the source array (the actual position 430) back on the source pre-plot path 450. This configuration is illustrated in FIG. 8D, in which the length of the rope 412a is now shorter, i.e., L+ΔL−ΔY, the actual position 430 lies on the source pre-plot path 450 and the virtual position 434 is closer to the pre-plot path 450. These adjustments continue until the actual position 430 and the virtual position 434 coincide again as in FIG. 8A.

Thus, the embodiment disclosed with regard to FIGS. 8A-D achieves a quick adjustment of the actual position of the source array by using the source steering device and then the vessel adjusts its position to bring the virtual position of the source array back on the source pre-plot path. During this process, the source steering device adjusts the length of its rope to account for the movement of the vessel on a lateral direction so that the actual position of the source array is maintained on or close to the source pre-plot path 450 as the virtual position 434 is adjusted by the vessel 402 to also be on or close to the source pre-plot path 450.

In this regard, it is noted that a position of the source array 406a may be determined by a GPS system that has a component 440a on the source array 406a and a component 440b on the vessel 402 as shown in FIG. 7. Alternatively, the position of the source array 406a may be determined using at least one of an acoustic system, radio-navigation means, a laser system, a radar system, etc. Communication between the components 440a and 440b may be achieved through wires that are part of the lead-ins 409a or 410a or attached to the lead-ins or through a wireless interface. The GPS and acoustic devices are known in the field and thus, no description is provided for these devices. The GPS and/or acoustic devices may be provided on a float (not shown) that maintains the actual sources at a desired depth until water. The float is configured to float at the surface of the water.

Thus, according to the above noted embodiment, the actual position 430 of the source array is fed to the controller 420 for adjusting the lengths of the cable 412a by the source steering device 408a while the virtual position 434 of the source array is used by the vessel for maintaining it along the source pre-plot path 450.

Figure 9:
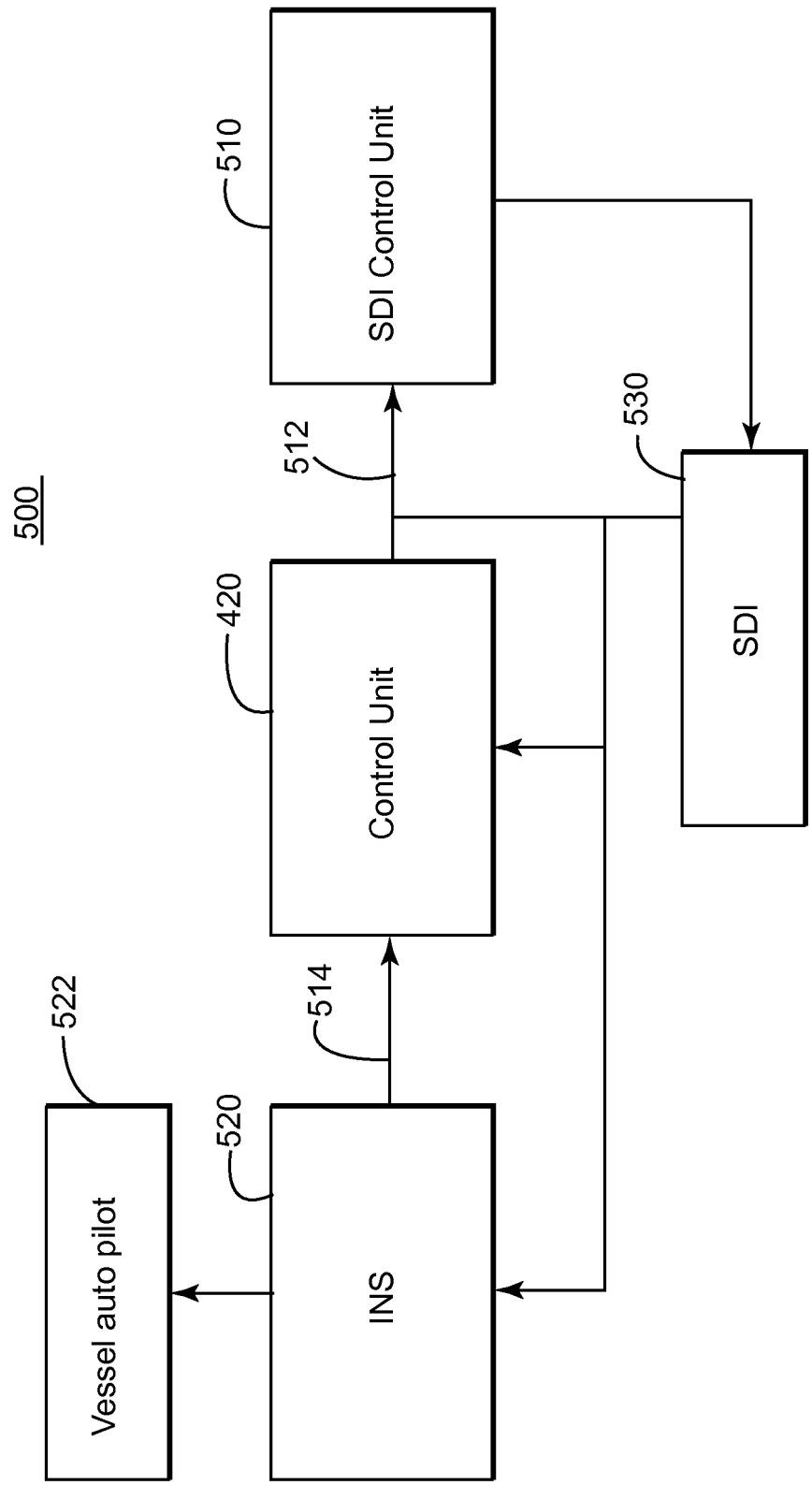
FIG. 9 is a schematic diagram of a control system of a seismic survey system according to an exemplary embodiment.

According to an exemplary embodiment illustrated in FIG. 9, a configuration of a control device 500 for controlling both the vessel 402 and the source steering device 408a may include the central controller 420, located, for example, on the vessel 402, and a local controller 510, located, for example, on the source array 406a. The two controllers communicate through a wired or wireless interface 512. The central control unit 420 may be configured to communicate through a link 514 with an integrated navigation system (INS) 520 of the vessel. The INS 520 controls the auto-pilot 522 of the vessel 402 and the local control unit 510 controls the source steering device SD1 530.

Figure 10:
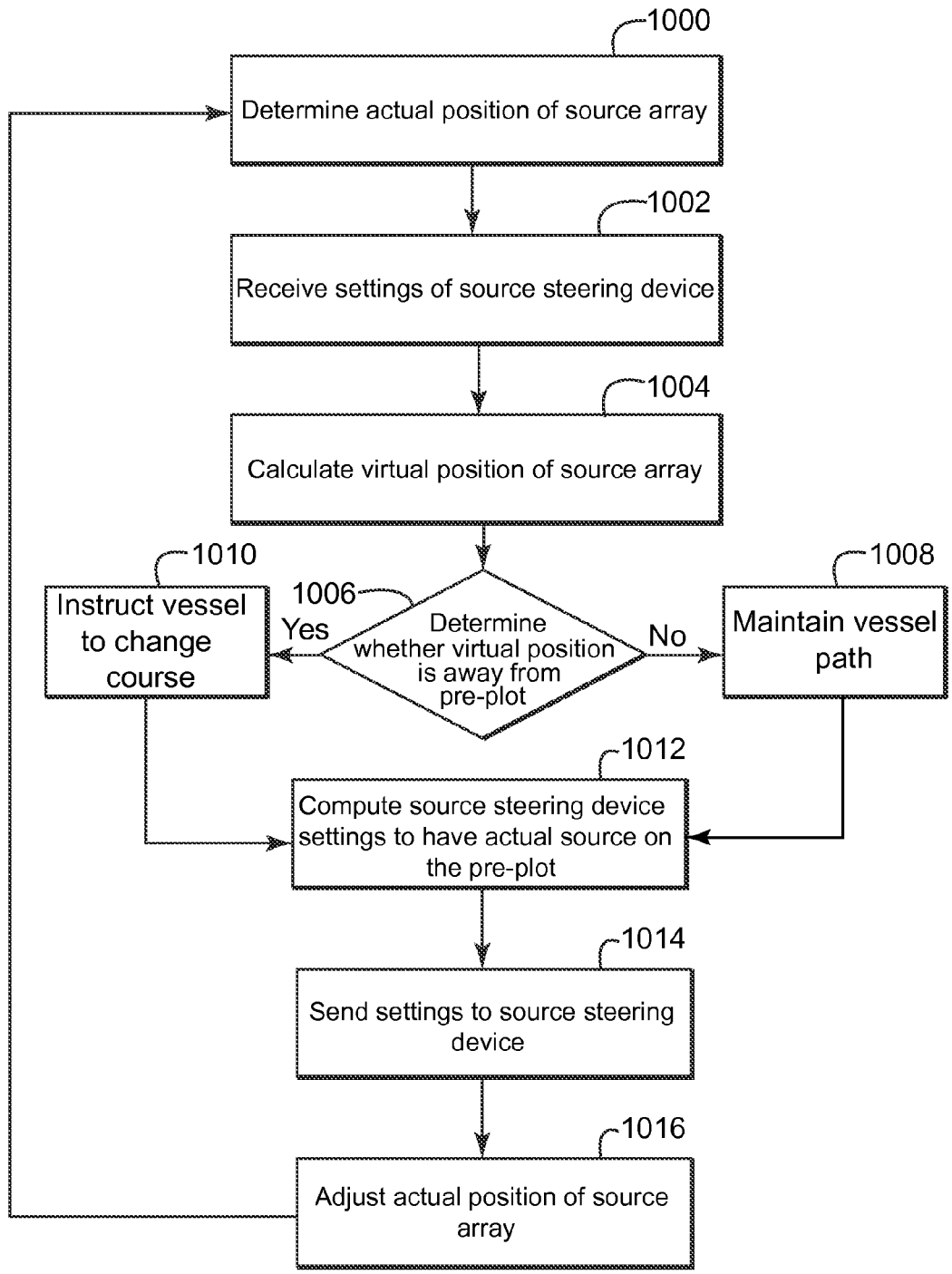
FIG. 10 is a flowchart of a method for controlling a seismic survey system according to an exemplary embodiment.

Controlling the position of the source array is now discussed with regard to FIG. 10. Based on the GPS and/or the acoustic data received from components 440a and 440b, the central control unit 420 computes in step 1000 the actual position 430 of the source array. In step 1002, the central control unit 420 receives the settings of the source steering device 408a and in step 1004 the central control unit 420 calculates the virtual position 434 of the source array 406a.

In step 1006, the central control unit 420 determines whether the virtual position 430 is away from the source pre-plot 450. If the answer is NO, the central control unit 420 instructs the INS 520 in step 1008 to maintain the path of the vessel unchanged and the same is transmitted by the INS 520 to the auto-pilot 522. If the answer is YES, the central control unit 420 instructs in step 1010 the vessel to change course so that the virtual position of the source array is brought back on the source pre-plot path 450. Irrespective of whether step 1008 or step 1010 is selected, the process advances to step 1012 in which the source steering device settings are calculated, for example, by the central control unit 420, so that the actual position of the source array is on the source pre-plot path 450. These settings are sent in step 1014 to the source steering device to extend or retract in step 1016 its rope (if a winch is used) to adjust the actual position of the source array. Then, the process returns to step 1000 and the previous steps are performed again to readjust the virtual position and/or the actual position of the source array. The process continues until both the actual position 430 and the virtual position 434 are on the source pre-plot path 450 or close enough to this path and/or the source heads in a right direction. In one exemplary embodiment, the novel process addresses not only adjusting the position (virtual and actual) of the source array but also obtaining the correct heading angle.

For the above method, the pre-plot information needs to be available either in the INS 520 or the central control unit 420. Further, it is noted that a deflector is used instead of a winch, an attack angle of the deflector is modified to adjust the actual position of the source array. If a thruster is used instead of a winch, the thrust is modified to adjust the actual position of the source array. The same is true for other types of source steering devices.

Based on the method described in FIG. 10, the rough tuning of the virtual position of the source array relative to the pre-plot position is performed by the vessel and the fine tuning of the actual position relative to the pre-plot position is performed by the source steering device.

Thus, according to an exemplary embodiment, the INS 520 does not use the actual position of the source array when adjusting the position of the vessel. The actual position of the source array is used to analyze the signals recorded by the streamers. Thus, for this analysis, the virtual positions of the source arrays are not used.

If more than one source array is controlled based on the above noted exemplary embodiments, it is possible to define pre-plot paths for each source and to monitor the actual positions and the virtual positions of these sources. Other variants of the above discussed embodiments may be envisioned by those skilled in the art based on the novel feature of using the virtual position for steering the vessel and the actual position for steering the source steering device.

In one exemplary embodiment, the local control unit 510 may be located on the vessel 402 instead of the source array. In another exemplary embodiment, the central control unit 420 may be part of the INS 520 or may be distributed at one or more of the source arrays. In still another exemplary embodiment, the central control unit 420 and the local control unit 510 may be implemented in the INS 520.

Figure 11:
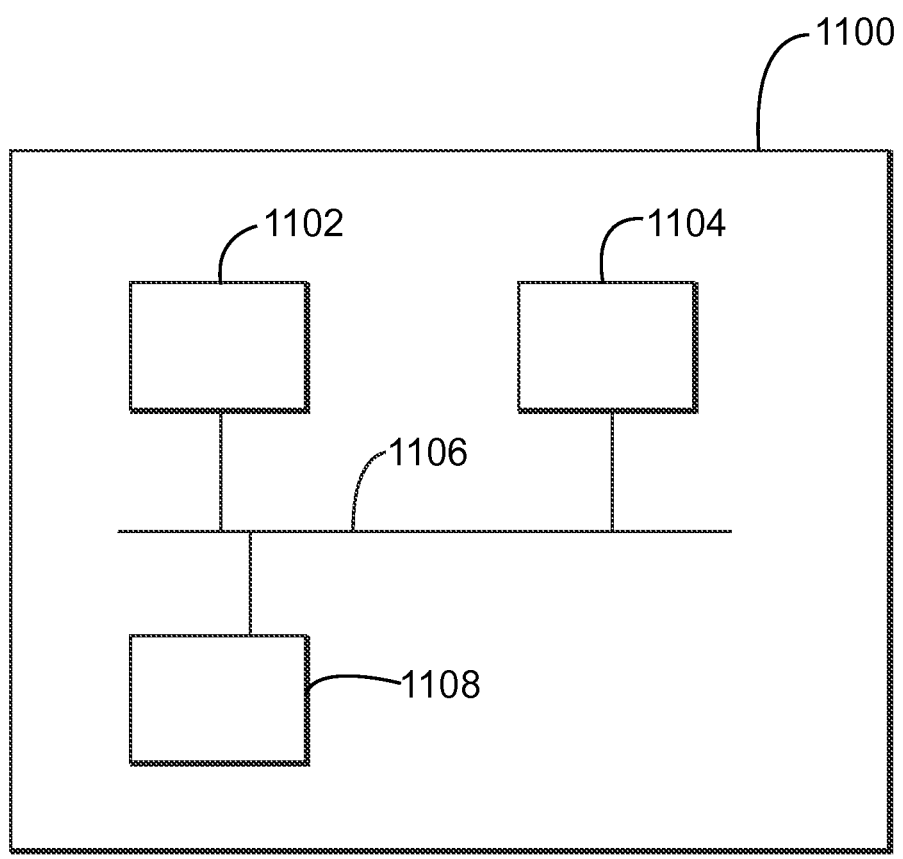
FIG. 11 is a schematic diagram of a controller according to an exemplary embodiment.

With regard to the local and/or central control units discussed above, a possible configuration of such a device is schematically illustrated in FIG. 11. Such a control unit 1100 may include a processor 1102 and a storage device 1104 that communicate together via a bus 1106. An input/output interface 1108 also communicates with the bus 1106 and allows an operator to communicate with the processor or the memory, for example, to input software instructions for operating the source steering devices. The input/output interface 1108 may also be used by the controller to communicate with other controllers or interfaces that are provided on the vessel. For example, the input/output interface 1108 may communicate with a GPS system (not shown) for acquiring the actual position of the source array or with an acoustical system for acquiring actual positions of the independent source elements of the source array. The controller 1100 may be a computer, a server, a processor or dedicated circuitry. Dedicated software for performing the steps noted in FIG. 10 may be provided in the storage device 1104.

Figure 12:
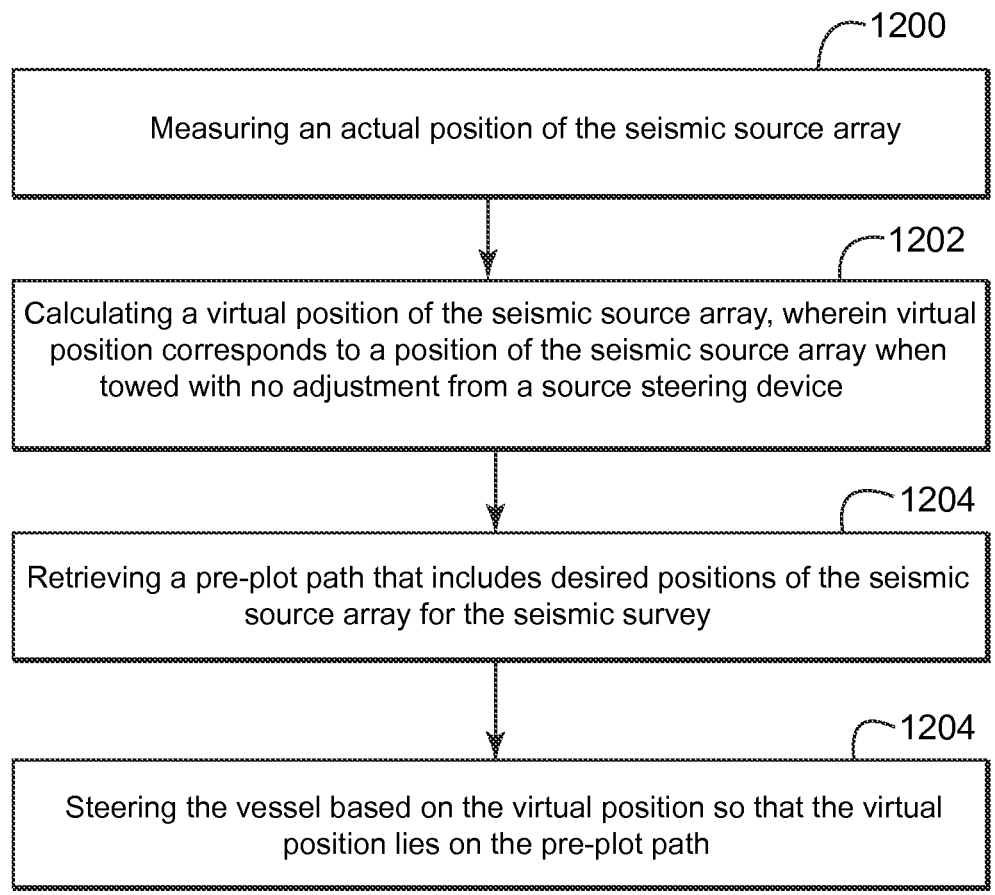
FIG. 12 is a flow chart of a method for steering a vessel according to an exemplary embodiment.

The control circuits noted above may also be used to implement a steering method as illustrated in FIG. 12. According to an exemplary embodiment illustrated in FIG. 12, there is a method for steering a seismic source array in a body of water during a seismic survey. The method includes a step 1200 of measuring an actual position of the seismic source array; a step 1202 of calculating a virtual position of the seismic source array, wherein the virtual position corresponds to a position of the seismic source array when towed with no adjustment from a source steering device; a step 1204 of retrieving a pre-plot path that includes desired positions of the seismic source array for the seismic survey; and a step 1206 of steering the vessel based on the virtual position so that the virtual position lies on the pre-plot path.

One or more of the exemplary embodiments discussed above provide one or more controllers that assess actual and virtual positions of a source array and use the two positions for bringing the actual position as close as possible to a pre-plot position. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for steering a seismic source array in a body of water during a seismic survey, the method comprising:
    measuring an actual position of the seismic source array;
    calculating a virtual position of the seismic source array, wherein the virtual position corresponds to a position of the seismic source array when towed with no adjustment from a source steering device;
    retrieving a pre-plot path that includes desired positions of the seismic source array for the seismic survey;
    actuating the source steering device to bring the actual position of the source array on the pre-plot path; and
    steering the vessel based on the virtual position so that the virtual position lies on the pre-plot path.

2. The method of claim 1, further comprising:
    actuating again the source steering device, when the actual position of the source array deviates from the pre-plot path due to the virtual position lying on the pre-plot path, so that the actual position approaches the pre-plot path.

3. The method of claim 1, further comprising:
    determining that the virtual position has moved away from the pre-plot path; and
    steering the vessel so that the virtual position approaches the pre-plot path.

4. The method of claim 3, further comprising:
    measuring again the actual position of the source array; and further actuating the source steering device to adjust the actual position to approach the pre-plot path.

5. The method of claim 1, further comprising:
adjusting the settings of the source steering device and a position of the vessel until the virtual position of the source array substantially coincides with the actual position of the source array.

6. The method of claim 1, further comprising:
adjusting first the source steering device when the actual position of the source array deviates from the pre-plot path; and
adjusting second the position of the vessel to change the virtual position of the source array.

7. The method of claim 6, further comprising:
adjusting third the source steering device to again change the actual position of the source array as a consequence of a change in the position of the vessel; and
adjusting fourth the position of the vessel to change the virtual position of the source array so that the virtual position approaches neutral settings of the source steering device.

8. The method of claim 7, wherein neutral settings are defined as an original distance between the source array and a corresponding lead-in towed by the vessel.

9. The method of claim 1, further comprising:
sending to the source steering device, based on a difference between the virtual position and the pre-plot path of the seismic source array, settings for adjusting the actual position of the seismic source array.

10. The method of claim 1, wherein the source steering device is configured to adjust a distance between the source array and a lead-in connected to the vessel.

11. A seismic surveying system configured to steer a seismic source array in a body of water during a seismic survey, the system comprising:
a central control unit configured to,
receive an actual position of the seismic source array, and
calculate a virtual position of the seismic source array, wherein the virtual position corresponds to a position of the seismic source array when towed with no adjustment from a source steering device;
a memory configured to store a pre-plot path that includes desired positions of the seismic source array for the seismic survey;
a local controller configured to actuate the source steering device to bring the actual position of the source array on the pre-plot path; and
an integrated navigation system configured to steer a vessel that tows the source array based on the virtual position so that the virtual position lies on the pre-plot path.

12. The seismic surveying system of claim 11,
wherein the local controller actuates again the source steering device, when the actual position of the source array deviates from the pre-plot path due to the virtual position lying on the pre-plot path, so that the actual position approaches the pre-plot path.

13. The seismic surveying system of claim 11, wherein central control unit is further configured to:

determine that the virtual position has moved away from the pre-plot path; and
provide information to the integrated navigation system to steer the vessel so that the virtual position approaches the pre-plot path.

14. The seismic surveying system of claim 13, wherein the central control unit is further configured to:
receive again an updated actual position of the source array; and
provide information to the source steering device to adjust the actual position to approach the pre-plot path.

15. The seismic surveying system of claim 11, wherein the settings of the source steering device and a position of the vessel are further adjusted until the virtual position of the source array substantially coincides with the actual position of the source array.

16. The seismic surveying system of claim 11, wherein:
first, the source steering device adjusts its settings when the actual position of the source array deviates from the pre-plot path; and
second, the position of the vessel is modified to change the virtual position of the source array.

17. The seismic surveying system of claim 16, wherein:
third, the source steering device again adjusts its settings to change the actual position of the source array as a consequence of a change in the position of the vessel; and
fourth, the position of the vessel is modified again to change the virtual position of the source array so that the virtual position approaches neutral settings of the source steering device.

18. The seismic surveying system of claim 17, wherein neutral settings are defined as an original distance between the source array and a corresponding lead-in towed by the vessel.

19. The seismic surveying system of claim 11, wherein the central control unit is configured to:
send to the source steering device, based on a difference between the virtual position and the pre-plot path of the seismic source array, settings for adjusting the actual position of the seismic source array.

20. A non-transitory computer readable medium including computer executable instructions, wherein the instructions, when executed by a processor, implement a method for steering a seismic source array in a body of water during a seismic survey, the method comprising:
measuring an actual position of the seismic source array;
calculating a virtual position of the seismic source array, wherein the virtual position corresponds to a position of the seismic source array when towed with no adjustment from a source steering device;
retrieving a pre-plot path that includes desired positions of the seismic source array for the seismic survey;
actuating the source steering device to bring the actual position of the source array on the pre-plot path; and
steering the vessel based on the virtual position so that the virtual position lies on the pre-plot path.

* * * * *